United States Patent
Inoue

[11] Patent Number: 6,100,935
[45] Date of Patent: Aug. 8, 2000

[54] SYNC GENERATOR UNIT AND FIELD DECISION UNIT USING IT

[75] Inventor: Tetsuhiko Inoue, Hyogo, Japan

[73] Assignees: Mitsubishi Electric System LSI Design Corporation, Itami; Mitsubishi Denki Kabushiki Kaisha, Tokyo, both of Japan

[21] Appl. No.: 09/010,591

[22] Filed: Jan. 22, 1998

[30] Foreign Application Priority Data

Sep. 3, 1997 [JP] Japan ................................. 9-238690

[51] Int. Cl.[7] ................................. H04N 5/06; H04N 5/12
[52] U.S. Cl. ................... 348/526; 348/521; 348/525; 348/531; 348/536
[58] Field of Search ........................... 348/525, 526, 348/563, 547, 513, 527, 521, 536, 533, 531, 500; 358/80, 357

[56] References Cited

U.S. PATENT DOCUMENTS

| | | | |
|---|---|---|---|
| 4,642,682 | 2/1987 | Orsburn | 358/80 |
| 4,947,264 | 8/1990 | Narusawa | 358/337 |
| 5,298,998 | 3/1994 | Furumiya et al. | 348/537 |
| 5,414,470 | 5/1995 | Hotta et al. | 348/530 |
| 5,473,387 | 12/1995 | Okada et al. | 348/526 |
| 5,485,208 | 2/1987 | Mabuchi | 348/335 |
| 5,748,252 | 5/1998 | Draves | 348/516 |
| 5,875,002 | 2/1999 | Nishiyama | 348/521 |

*Primary Examiner*—Mark R. Powell
*Assistant Examiner*—Wesner Sajous
*Attorney, Agent, or Firm*—Burns, Doane, Swecker & Mathis, LLP

[57] ABSTRACT

A field decision unit capable of solving a problem involved in a conventional field decision unit in that an internal synchronizing signal can be erroneously synchronized with the equalizing pulses of a video signal owing to noise because the output halt period of a phase comparator is set rather short considering that this will facilitate the synchronization of the internal synchronizing signal with the video signal when starting the system or the like, and hence an incorrect field decision can be made. The present field decision unit includes an output controller which sets output halt pulses with a longer output halt period in a particular interval consisting of the synchronizing cycles containing the equalizing pulses and a synchronizing cycle previous thereto, and which employs output halt pulses with a shorter output halt period outside the particular interval as in the conventional system.

6 Claims, 6 Drawing Sheets

☐ OUTPUT PERIOD OF PERIOD CORRECTING PULSE

▨ OUTPUT HALT PERIOD OF PERIOD CORRECTING PULSE

1

SYNC GENERATOR UNIT AND FIELD DECISION UNIT USING IT

BACKGROUND OF THE INVENTION

1. Field of the Invention

The present invention relates to a sync generator unit and a field decision unit applied to a telecasting system or a video playback system, and particularly to a sync generator unit for generating an internal synchronizing signal containing synchronizing signal components synchronized with the synchronizing signal components of a video input signal such as a composite video signal for telecasting including the synchronizing signal components, and a field decision unit for making a field decision of the video input signal using the sync generator unit.

2. Description of Related Art

FIG. 5 is a block diagram showing a configuration of a conventional field decision unit. In FIG. 5, the reference numeral 1 designates a sync separation circuit for seating from a composite video signal Cv (video input signal) its horizontal and vertical synchronizing signal components and outputting them as the horizontal synchronizing signal Hs and vertical synchronizing signal Vs; 2 designates a phase comparator for receiving the horizontal synchronizing signal Hs and internal synchronizing signal Is, and for generating period correcting pulses Pc with a pulse width corresponding to the input timing difference between the synchronizing signal components contained in the two inputs; 6 designates a lowpass filter (LPF) for smoothing the period correcting pulses Pc and producing a level signal corresponding to their pulse width; 7 designates a voltage controlled oscillator for generating a signal with a frequency corresponding to the level signal, 8 designates a frequency divider for dividing the frequency signal output from the voltage controlled oscillator 7 and for outputting the internal synchronizing signal Is; 5 designates a field decision circuit which receives the internal synchronizing signal Is and vertical synchronizing signal Vs, and makes a field decision based on the two inputs; and 4 designates an output controller for producing an output halt signal Ph for suspending the output of the period correcting pulses Pc from the phase comparator 2.

Next, the structure of the composite video signal will be described of the NTSC (National Television System Committee) color system widely employed in the telecasting. Since the composite video signal draws a display screen with 525 horizontal scanning lines, its period corresponds to 525 horizontal synchronization cycles. In addition, since each screen is displayed using interlace scanning, a pulse train for the vertical synchronization is superimposed at every 262.5 scanning line intervals. More specifically, each field consisting of 262.5 scanning lines includes, in its initial nine horizontal synchronization cycles, equalizing pulses superimposed thereon with a period of half that of the horizontal synchronizing signal. In particular, the phase of the equalizing pulses are inverted (that is, shifted by 180 degrees) during three cycles from fourth to sixth horizontal synchronization cycle.

Next, the operation of the conventional field decision unit will be described.

Receiving the composite video signal Cv, the sync separation circuit 1 outputs the horizontal synchronizing signal Hs at every horizontal synchronization cycle. The phase comparator 2, comparing the synchronizing signal component of the horizontal synchronizing signal Hs and that of the internal synchronizing signal Is, makes a decision of the input timings of the two synchronizing signal components, and outputs the period correcting pulses Pc with a pulse width corresponding to the input timing difference. The period correcting pulses Pc vary the level of the level signal output from the lowpass filter 6, the oscillation frequency of the voltage controlled oscillator 7, and then the frequency of the internal synchronizing signal Is output from the frequency divider 8. Thus, the phase of the synchronizing signal component of the internal synchronizing signal Is varies such that it matches the phase of the synchronizing signal component of the horizontal synchronizing signal Hs, resulting in the synchronization of the two synchronizing signal components.

In parallel with this, the sync separation circuit 1 outputs the vertical synchronizing signal Vs at every field interval of the composite video signal Cv. It is generated on the basis of the input timings of the equalizing pulses with their phase inverted in the fields. Considering the phase of the vertical synchronizing signal Vs with respect to that of the synchronizing signal component of the internal synchronizing signal Is, the field decision circuit 5 makes a field decision based on the phase relation. More specifically, as is apparently seen by comparing FIGS. 6A and 6B, when the synchronizing cycle of the internal synchronizing signal Is in completely in synchronization with the horizontal synchronizing cycle, the phase of the vertical synchronizing pulse with respect to that of the synchronizing signal component of the internal synchronizing signal Is in the first field as indicated by C of FIG. 6A is shifted from that in the second field as indicated by D by an amount of half the synchronizing cycle because each field consists of 262.5 horizontal synchronizing cycles. Thus, the field decision unit identifies the case A of FIG. 6A, in which the synchronizing signal component of the internal synchronizing signal Is arrives immediately after the vertical synchronizing pulse, as the first field, and the case B of FIG. 6B, in which it arrives just before the vertical synchronizing pulse, as the second field.

The output halt signal Ph supplied from the output controller 4 to the phase comparator 2 as shown in FIG. 5 controls the phase comparator 2 so that it suppresses the period correcting pulses Pc that would allow the synchronization of the internal synchronizing signal Is with the equalizing pulses superimposed on the middle positions of the horizontal synchronizing cycles.

A telecasting receiving system or a video playback system incorporating such a field decision unit generates ramp waves based on the horizontal synchronizing signal Hs and vertical synchronizing signal Vs, and supplies a display like a cathode-ray tube (CRT) with a voltage based on the composite video signal Cv while driving it with the ramp waves, thus displaying restored images by scanning the display.

With such a configuration, the conventional field decision unit has a problem in that it suffers from erroneous phase deviation of the internal synchronizing signal Is from the composite video signal Cv by an amount of half the synchronizing cycle due to noise superimposed on the composite video signal Cv and the like.

This will be described in more detail.

Such a malfunction can be prevented by producing the output halt pulses Ph in almost allover the synchronizing cycles to effectively suppress all types of noise. This, however, will present a new problem. For example, when the internal synchronizing signal Is has not yet synchronized with the composite video signal Cv as in the case of starting the system or switching the composite video signal Cv, it is difficult to identify the synchronizing cycle of the composite video signal Cv, and there would be a possibility that the synchronization cannot be established in the worst case. Therefore, the output duration of the output halt pulses Ph is set rather short based on such a practical observation.

With respect to this, the composite video signal Cv includes an interval (called the equalizing pulse interval from now on) during which the equalizing pulses occur at every half the synchronizing cycle interval. If there is some incoming noise during the equalizing pulse interval, that is, from the first to ninth synchronizing cycle of each field, the phase comparator 2 and sync separation circuit 1 will operate outside the output halt period such that they try to establish synchronization with the noise because they confuse it with the synchronizing signal component. Since the output period of the output halt pulses Ph is set rather short as described above, the pulse width of the period correcting pulse Pc due to the confusion can become broad, thereby varying the synchronizing signal component of the internal synchronizing signal Is by a large amount. This will result in the synchronization of the synchronizing signal component of the internal synchronizing signal Is with the equalizing pulses at the middle of the synchronizing cycle because the conventional output halt period is set rather short. As a result, the field decision made after these equalizing pulses will identify the first field as the second field, or vice versa, because of the phase deviation of the internal synchronizing signal Is by an amount of half the synchronizing cycle with respect to the composite video signal Cv.

In view of this, a field decision unit is proposed that continues the output of the output halt pulses Ph throughout the equalizing pulse interval as the field decision unit disclosed in Japanese patent application laid-open No. 5-56304/1993.

However, this technique cannot fully prevent the erroneous synchronization with the equalizing pulses. For example, when the incoming noise occurs just before the equalizing pulse interval, the internal synchronizing signal Is can be synchronized with the equalizing pulses at the middle of the synchronizing cycle because of the synchronization control based on the noise.

In addition, the foregoing technique does not ensure the correct synchronization in the equalizing pulse interval, and even minimal differences of synchronization can cause, when accumulated, the deviation in the field decision timing, resulting in erroneous field decision or synchronizing cycle identification. This will further presents a secondary problem in that once the synchronization is lost, it cannot be recovered in a short time even if the synchronization control is restarted immediately.

SUMMARY OF THE INVENTION

The present invention is implemented to solve the foregoing problem. It is therefore an object of the present invention to provide a sync generator unit which can easily establish the synchronization of the internal synchronizing signal with the composite video signal Cv even in such a case as starting the system or switching the composite video signal Cv, and which can prevent the internal synchronizing signal from being erroneously synchronized with the equalizing pulses at the middle of the synchronizing cycle.

Another object of the present invention is to provide a field decision unit capable of preventing the incorrect field decision due to erroneous synchronization of the internal synchronizing signal with the equalizing pulses at the middle of the synchronizing cycle.

According to a first aspect of the present invention, there is provided a sync signal generating unit for generating an internal synchronizing signal in synchronism with a video input signal, the sync signal generating unit comprising: a phase comparator which receives the internal synchronizing signal and an input signal corresponding to the video input signal, and which outputs a period correcting signal in response to an input timing difference between a synchronizing signal component contained in the internal synchronizing signal and a synchronizing signal component contained in the input signal; a sync generator for outputting the internal synchronizing signal with adjusting, in response to the period correcting signal, an output period of the synchronizing signal component of the internal synchronizing signal; and an output controller for generating an output halt pulse train for controlling the phase comparator such that the phase comparator suppresses output of the period correcting signal, wherein the output controller outputs the output halt pulse train consisting of pulses, each of which corresponds to one of synchronizing cycles of the input video signal and has a pulse width shorter than a period of the synchronizing cycles, and wherein the output controller, identifying the synchronizing cycles of the video input signal using the synchronizing signal components of one of the internal synchronizing signal and the input signal, makes the width of each pulse of the output halt pulse train in a particular interval longer than that in a normal interval outside the particular interval, the particular interval including at least synchronizing cycles containing synchronizing signal components occurring at every ½ synchronizing cycle interval, plus one synchronizing cycle previous to the synchronizing cycles.

Here, the output control circuit may comprise a counter for intermittently carrying out for each synchronizing cycle two types of counting corresponding to the width of the pulses of the output halt pulse train, and for outputting two count signals corresponding the pulse width of the output halt pulses, and a selector for selecting one of the two count signals, and for outputting it as the output halt pulse train.

The output controller may further comprise a flag register which undergoes settings in response to individual synchronizing signal components of the internal synchronizing signal; operating means for resetting the flag register and outputting switching data in response to a number of times of the settings of the flag register; and a selecting register for supplying the selector with a select signal corresponding to the switching data.

The output controller may further comprise a cycle counter for outputting a switching pulse in response to a number of input times of the synchronizing signal components of the internal synchronizing signal; and a holding circuit for supplying the selector with a select signal in response to the switching pulse.

The output controller may further comprise a counter for outputting a count signal in response to a number of input times of the synchronizing signal components of the internal synchronizing signal; first and second period setting registers to which setting values corresponding to the particular interval and the normal interval are set, respectively; a first equality circuit for comparing an output of the first period setting register with the count value of the counter, and for outputting a coincidence signal when they agree with each other; a second equality circuit for comparing an output of the second period setting register with the count value of the counter, and for outputting a coincidence signal when they agree with each other; and a holding circuit for supplying the selector with a select signal in response to each of the coincidence signals.

According to a second aspect of the present invention, there is provided a field decision unit comprising: the foregoing sync signal generating unit for generating an internal synchronizing signal in synchronism with a video input signal; and a field decision circuit for making a field decision based on the input signal and the internal synchronizing signal after a synchronizing cycle has passed which contains synchronizing signal components occurring at every ½ synchronizing cycle.

BRIEF DESCRIPTION OF THE DRAWINGS

FIGS. 6A and 6B are timing charts showing the field decision, wherein FIG. 6A illustrates a first field and FIG. 6B illustrates a second field.

DETAILED DESCRIPTION OF THE PREFERRED EMBODIMENTS

The invention will now be described with reference to the accompanying drawings.
EMBODIMENT 1

Figure 1:
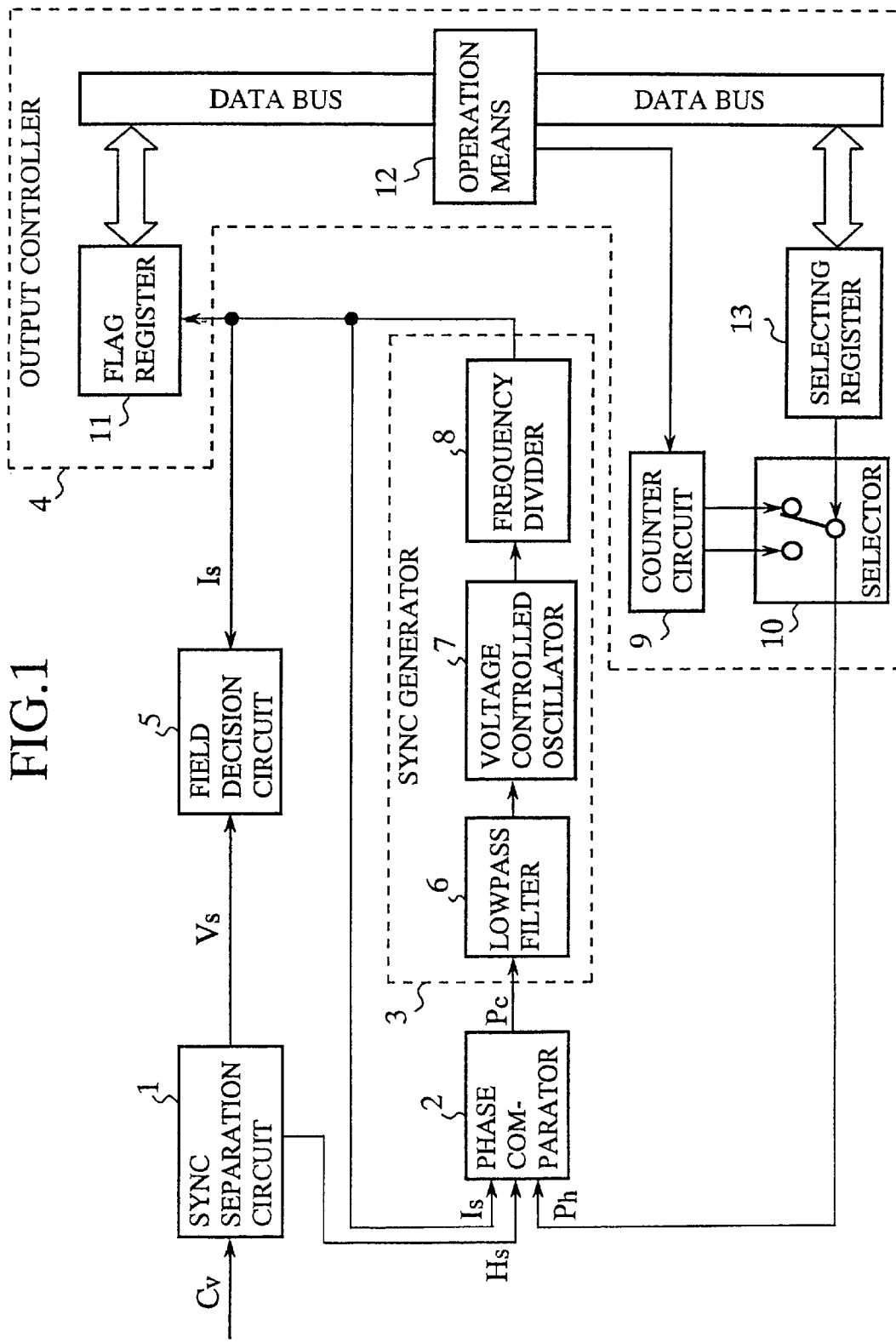
FIG. 1 is a block diagram showing a configuration of an embodiment 1 of an integrated circuit for-making a field decision in accordance with the present invention.

FIG. 1 is a block diagram showing a configuration of an embodiment 1 of an integrated circuit for making a field decision in accordance with the present invention. In FIG. 1, the reference numeral 1 designates a sync separation circuit for separating from a composite video signal Cv (video input signal) its horizontal synchronizing signal component and vertical synchronizing signal component and output as the horizontal synchronizing signal Hs and vertical synchronizing signal Vs; 2 designates a phase comparator which, receiving the horizontal synchronizing signal Hs and internal synchronizing signal Is, generates period correcting pulses Pc (period correcting signal), each of which having a pulse width corresponding to the input timing difference between the synchronizing signal components contained in the two inputs; 3 designates a sync generator for generating the internal synchronizing signal Is by controlling the period of its synchronizing signal component in response to the pulse width of the period correcting pulses Pc; 4 designates an output controller for producing an output halt pulse train Ph for suspending the output of the period correcting pulses Pc from the phase comparator 2; and 5 designates a field decision circuit which, receiving the internal synchronizing signal Is and vertical synchronizing signal Vs, makes a field decision on the basis of the two inputs, and supplies other circuits with the internal synchronizing signal Is and the result of the field decision.

The sync generator 3 comprises a lowpass filter (LPF) 6 for smoothing the period correcting pulses Pc and producing a level signal corresponding to their pulse width; a voltage controlled oscillator 7 for generating a signal with a frequency corresponding to the level signal; and a frequency divider 8 for dividing the frequency signal output from the voltage controlled oscillator 7 and for generating the internal synchronizing signal Is.

The output controller 4 comprises a counting circuit (period counter) 9 which has two count outputs, carries out counting for each synchronizing cycle, and outputs count signals from the count outputs during its counting period; a selector 10 for selecting one of the two count signals and outputs it as the output halt pulse train Ph; a flag register 11 which is set each time the synchronizing cycle of the internal synchronizing signal Is is input; a operation means 12 for accessing the flag register 11 to reset its flag, and for outputting a switching pulse each time it carries out a predetermined number of resets; and a select register 13 for supplying the selector 10 with a switching signal in response to the switching pulse.

Figure 2A:
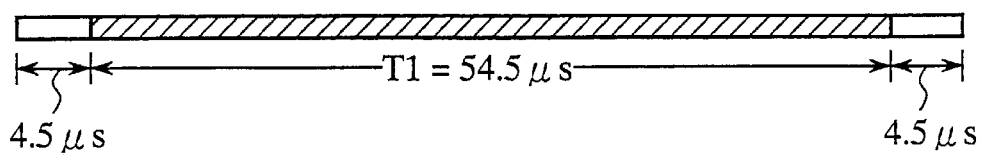
FIG. 2A is a diagrams showing an output halt period T1 of each output halt pulse in a particular interval.
Figure 2B:
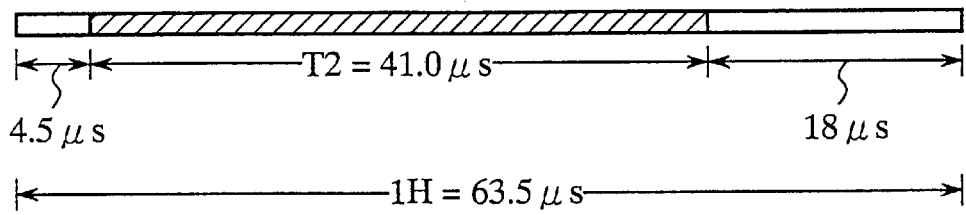
FIG. 2B is a diagrams showing an output halt period T2 of each output halt pulse in a normal interval.

FIGS. 2A and 2B are diagrams showing the output halt period of the period correcting pulse in a particular interval and a normal interval, respectively. Here, the particular interval refers to an interval chiefly including the initial nine synchronizing cycles of each field, in which the equalizing pulses with a period of H/2 are output. In the present embodiment, the particular interval is determined such that it includes the synchronizing cycles from the third previous one of each field to the ninth one of the field. It can be determined such that it includes the synchronizing cycles from the first previous one of each field to the ninth one of the field. On the other hand, the normal interval refers to an interval including the remaining synchronizing cycles from the 10th one to 260th one.

The switching between the particular interval and normal interval is carried out by the operation means 12. The operation means 12 counts the number of times of setting of the synchronizing cycles by the flag register 11, and outputs the switching pulse at the border between the two intervals. Thus, the select register 13 supplies the selector 10 with the switching signal.

On the other hand, the counter 9 counts, for each synchronizing cycle, the output halt period T1 in the particular interval and the output halt period T2 in the normal interval as shown in FIGS. 2A and 2B, respectively, and outputs them from its two output terminals.

In particular, in the present embodiment 1, the selector 10 is switched such that the width of the output halt pulses in the particular interval becomes longer than that in the normal interval. More specifically, in each the synchronizing cycle in the particular interval, the period correcting pulse is allowed to be output for about 4.5 microseconds immediately after and before the rising edges of the synchronizing signal-component as shown in FIG. 2A, and the output halt pulse is output during the remaining period of T1 (=about 54.5 microseconds). In contrast, in the normal interval, the period correcting pulse is allowed to be output for about 4.5 microseconds immediately after and 18 microseconds immediately before the rising edges of the synchronizing signal component as shown in FIG. 2B, and the output halt pulse is output during the remaining period of T2 (=about 41.0 microseconds). Here, one synchronizing cycle, that is, 1H is about 63.5 microseconds in the NTSC color system.

Next, the operation of the present embodiment 1 will be described.

It is assumed here that the composite video signal Cv is based on the NTSC color system.

Receiving the composite video signal Cv, the sync separation circuit 1 outputs the horizontal synchronizing signal Hs. The phase comparator 2, comparing the synchronizing signal component of the horizontal synchronizing signal Hs and that of the internal synchronizing signal Is, outputs the period correcting pulses Pc when there is an input timing difference between the two. The period correcting pulses Pc control the level of the level signal output from the lowpass filter 6, and thus control the oscillation frequency of the voltage controlled oscillator 7, and the frequency of the internal synchronizing signal Is output from the frequency divider 8. Therefore, the phase of the synchronizing signal component of the internal synchronizing signal Is is controlled in response to the synchronizing signal component of the composite video signal Cv such that no period correcting pulse Pc is output, that is, the two synchronizing signal components are synchronized.

The sync separation circuit 1, on the other hand, outputs the vertical synchronizing signal Vs containing the vertical synchronizing component in response to the inversion of the phase of the equalizing pulses of the composite video signal Cv. Receiving the vertical synchronizing component at the fourth synchronizing cycle of a field, the field decision circuit 5 checks the relationship between the phase of the vertical synchronizing component and that of the synchronizing signal component of the internal synchronizing signal Is, thereby making a decision of the field: When the synchronizing signal component of the internal synchronizing signal Is arrives immediately after the vertical synchronizing pulse, the present field is identified as the first field, and when it arrives immediately before the vertical synchronizing pulse, the present field is identified as the second field.

Under the foregoing situation, in the output controller 4, the flag register 11 is set in response to the synchronizing signal component of the internal synchronizing signal Is, and the operation means 12 counts the number of times of the set operations. Counting the predetermined number of times of the set operations, the operation means 12 supplies the selecting register 13 with the switching pulse. The selecting register 13 supplies the selector 10 with the switching signal in response to the switching pulse. The selector 10 selects one of the count outputs of the counter circuit 9, and supplies it to the phase comparator 2 as the output halt pulse train Ph. In parallel with this, the counter circuit 9 outputs the count signal for the output halt period T1 or T2 in synchronism with the synchronizing cycle. Thus, the phase comparator 2 receives the output halt pulse train Ph during each output halt period T1 or T2 in synchronism with the synchronizing cycle, and suspends the output of the compared result of the internal synchronizing signal Is with the horizontal synchronizing signal Hs, that is, the output of the period correcting pulse Pc during that period.

As a result, according to the present embodiment 1, even if noise has occurred in the input period of the equalizing pulses or immediately before that period, the synchronizing signal component of the internal synchronizing signal Is is synchronized with the synchronizing signal component of the horizontal synchronizing signal Hs at the fourth synchronizing cycle, which enables the field decision to be made correctly.

In addition, the output halt pulses with the shorter output halt period T2 output in the normal interval enable the internal synchronizing signal to be synchronized with the composite video signal Cv which is input at the start of the system or the like, thereby making it possible to establish the synchronization easily as in the conventional system.

As described above, in the present embodiment 1, the output controller 4 identifies the synchronizing cycles of the video input signal in response to the synchronizing signal component of the internal synchronizing signal Is, and outputs at every synchronizing cycle the output halt pulses, the width of which is shorter than the synchronization period 1H of the video input signal. Thus, the phase comparison between the internal synchronizing signal Is and the input signal is made at every synchronizing cycle. This enables the synchronizing signal component of the internal synchronizing signal Is to be synchronized quickly with the synchronizing signal component of the video input signal.

In particular, since the output period of each pulse of the output halt pulse train Ph is widened to T1 in the particular interval, which includes the synchronizing cycles in which the synchronizing signal component appears at every H/2 interval (equalizing pulse interval) and one synchronizing cycle previous to the equalizing pulse interval, it is rare that the noise in that period is erroneously identified as the synchronizing signal component. In addition, even if the noise is erroneously identified as the synchronizing signal component, since the output halt period is lengthened to T1 in the particular period, it is avoidable that the internal synchronizing signal Is is synchronized with the equalizing pulses at the middle of the synchronizing cycles, that is, with the video input signal which is shifted by ½ synchronizing cycle.

In contrast, since the output halt pulse is made shorter in the normal interval as in the conventional system, the internal synchronizing signal Is can be easily synchronized with the composite video signal Cv even when the system is started or the composite video signal Cv is switched.

In addition, the output controller 4 of the present embodiment 1 includes two counters for counting the synchronizing cycles and outputting the count signals during the counting periods, and a selector for selecting one of the count signals as the output halt pulses. This makes it possible to switch in real time the width of each pulse of the output halt pulse train Ph at each synchronizing cycle with a simple configuration.

Furthermore, since the selector 10 is switched using the flag register 11 which is set each time the synchronizing signal component is applied, and the operation means 12 which resets the flag register 11 and counts the number of times of the setting operations of the flag register 11, the output controller 4 can be implemented with a minimum increase of hardware.

EMBODIMENT 2

Figure 3:
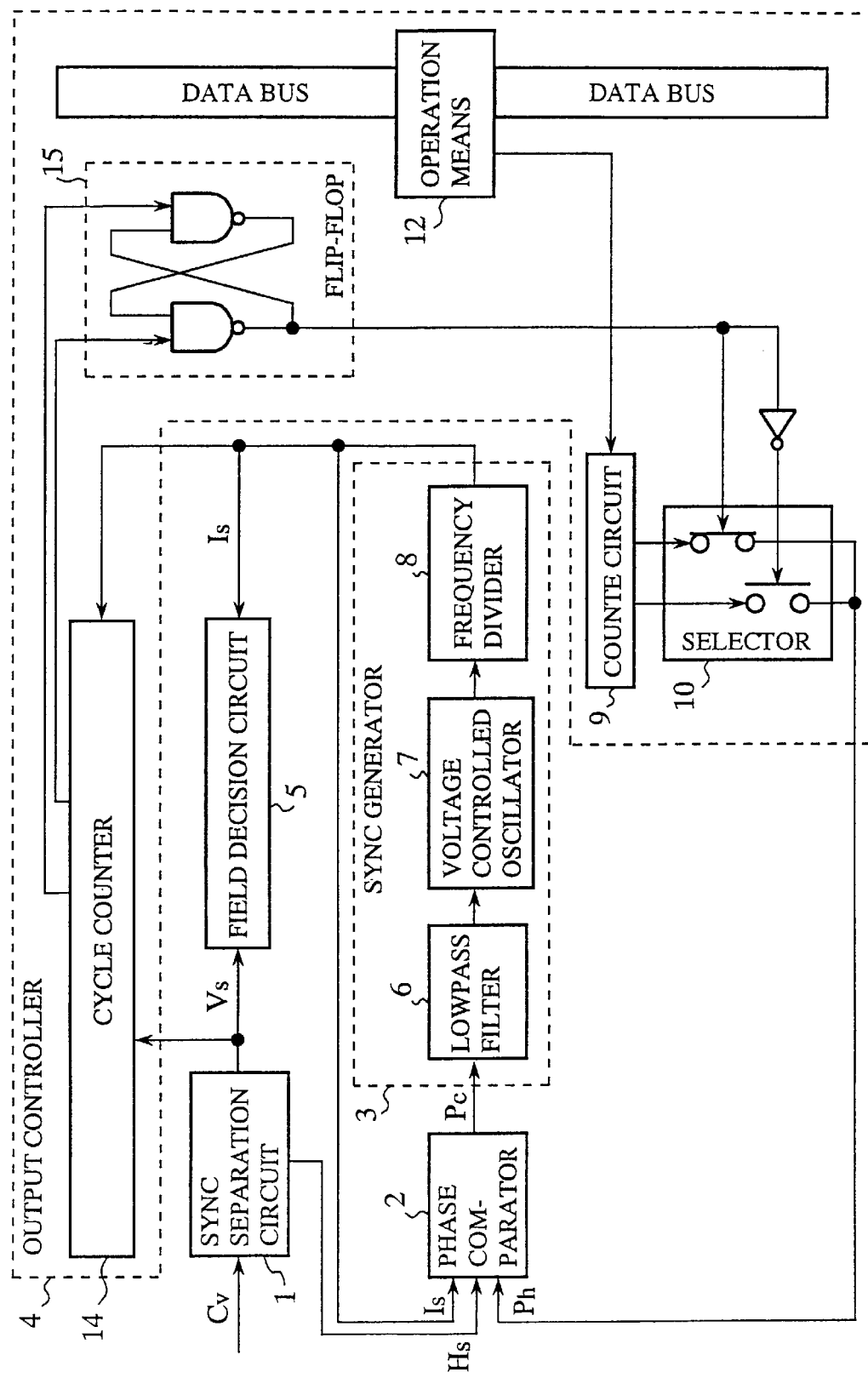
FIG. 3 is a block diagram showing a configuration of an embodiment 2 of the integrated circuit for making a field decision in accordance with the present invention.

FIG. 3 is a block diagram showing an embodiment 2 of the field decision unit in accordance with the present invention. In FIG. 3, the reference numeral 14 designates a cycle counter that counts the synchronizing signal components contained in the internal synchronizing signal Is and outputs a switching pulse, the count value of which is reset by the vertical synchronizing pulse. The reference numeral 15 designates a flip-flop (hold circuit) for supplying the selector 10 with a select signal in response to the switching pulse. Since the remaining configuration is the same as that of the embodiment 1 as shown in FIG. 1, the description thereof is omitted here by designating the corresponding portions by the same reference numerals.

Next, the operation of the present embodiment 2 will be described.

Since the operations of the sync separation circuit 1, phase comparator 2, sync generator 3 and field decision circuit 5 are the same as those of the embodiment 1, only the operation of the output controller 4 will be described.

First, the cycle counter 14, after reset by the vertical synchronizing pulse, increments its count value by one each time the synchronizing signal component of the internal synchronizing signal Is is input. When its count value reaches nine, it outputs the switching pulse so that the flip-flop 15 switches its output in response to the switching pulse. Thus, the selector 10 switches its output to the output halt pulse train Ph with the shorter pulse width T2.

The cycle counter 14, continuing its count-up, outputs the other switching pulse when its count value reaches third synchronizing cycles before the next field, that is, when it reaches the particular interval. The flip-flop 15 switches its output in response to the switching pulse, and the selector 10 outputs the output halt pulse train Ph with the longer pulse width T1.

In this way, the output controller 4 of the present embodiment 2 can switch the width of each pulse of the output halt pulse train Ph in synchronism with the synchronizing cycles.

As described above, according to the present embodiment 2, the output controller 4 with the foregoing configuration can prevent the internal synchronizing signal Is from being erroneously synchronized to the video input signal with its phase deviated by ½ synchronizing cycle. Furthermore, the internal synchronizing signal Is can be easily synchronized with the composite video signal Cv when the system is started or the composite video signal Cv is switched. Moreover, the load of the operation means 12 can be reduced.

EMBODIMENT 3

Figure 4:
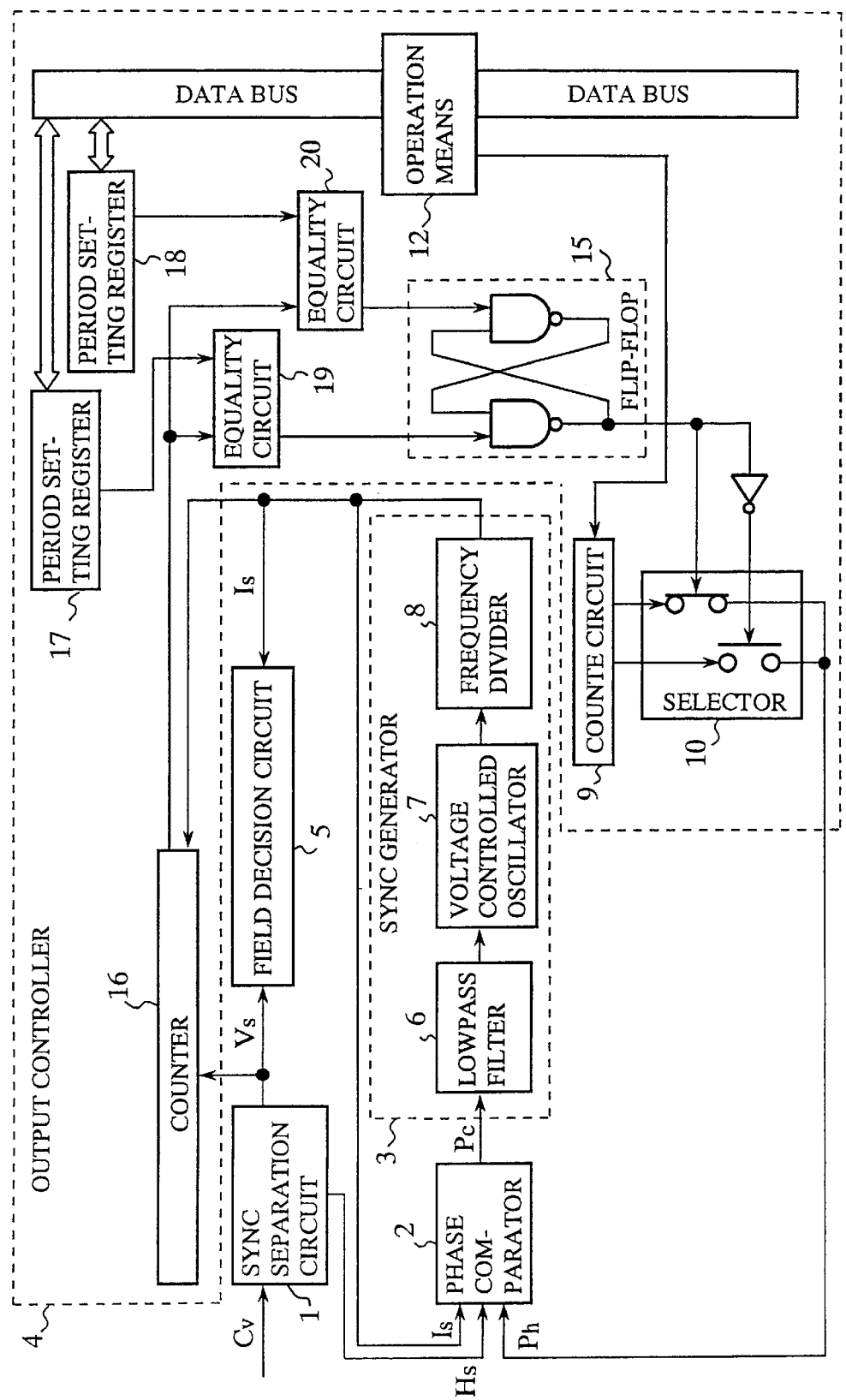
FIG. 4 is a block diagram showing a configuration of an embodiment 3 of the integrated circuit for making a field decision in accordance with the present invention.
Figure 5:
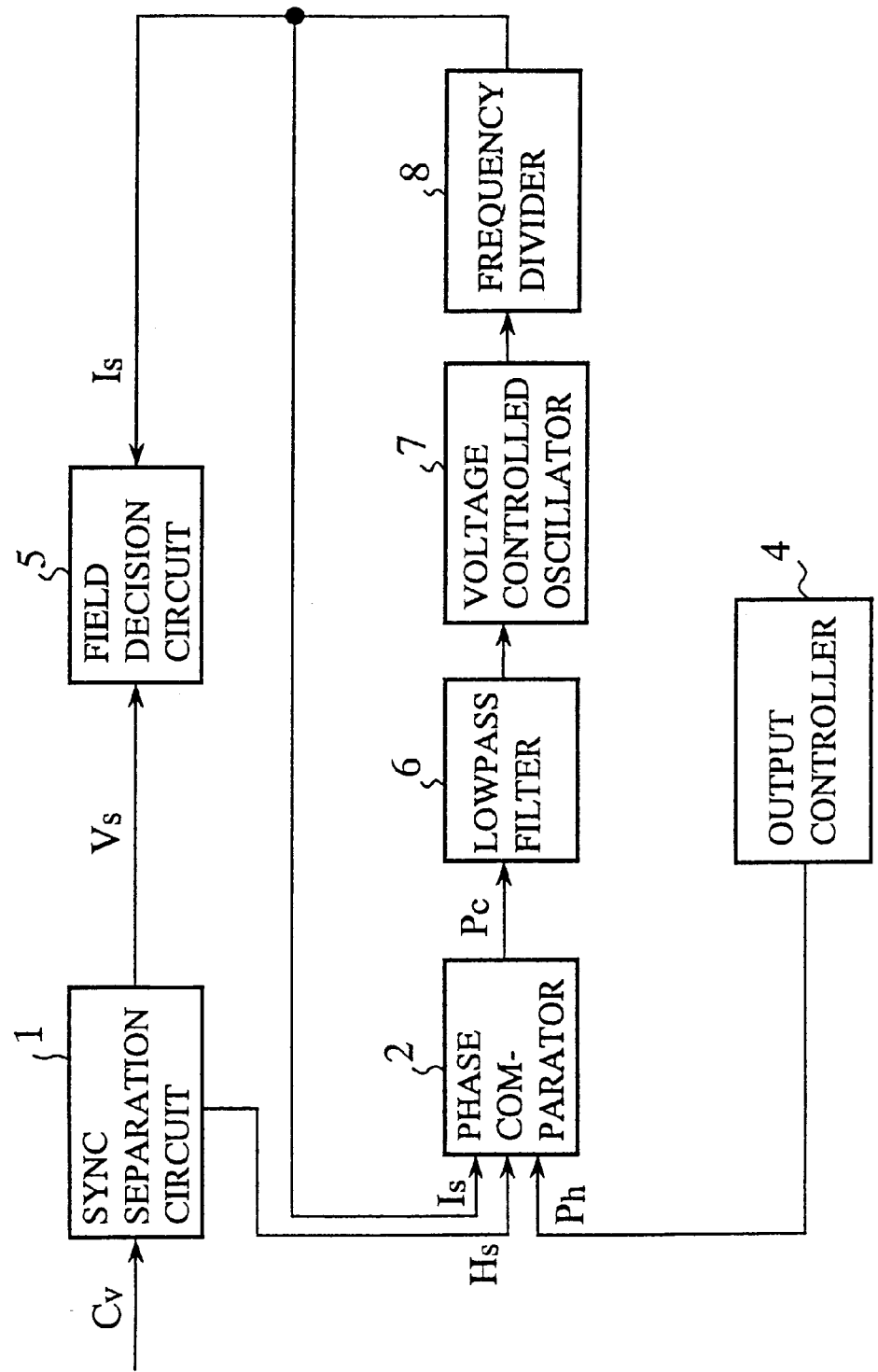
FIG. 5 is a block diagram showing a configuration of a conventional field decision unit.
Figure 6A:
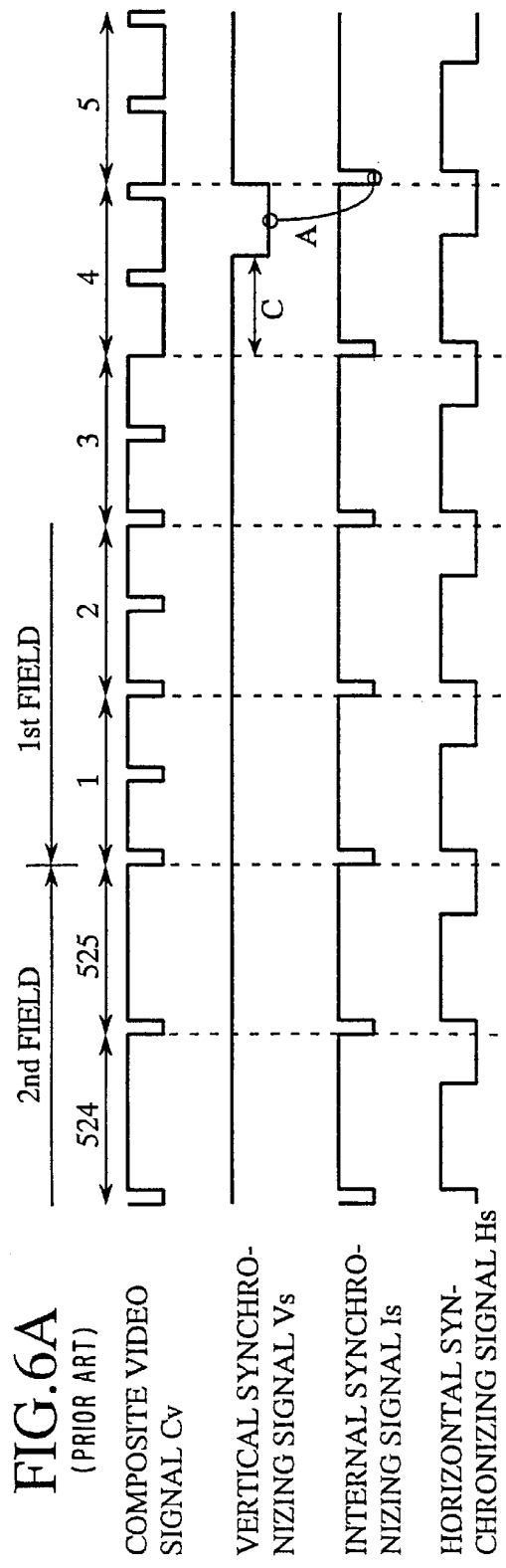
Figure 6B:
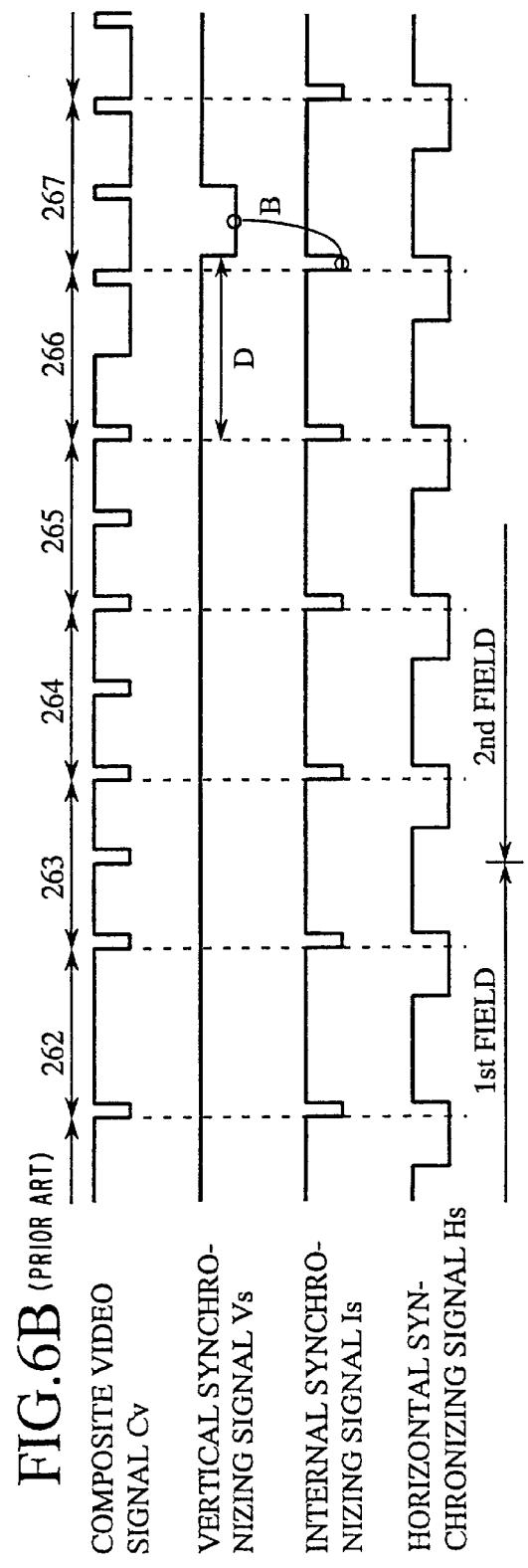

FIG. 4 is a block diagram showing an embodiment 3 of the field decision unit in accordance with the present invention. In FIG. 4, the reference numeral 16 designates a counter for counting the synchronizing signal components contained in the internal synchronizing signal Is, and for outputting it, in which the count value is reset by the vertical synchronizing pulse. The reference numerals 17 and 18 designate period setting registers for setting the numbers of the synchronizing cycles at which the switching is carried out from the particular interval to the normal interval and vice versa. The reference numerals 19 and 20 designate equality circuits for comparing the outputs of the period setting registers 17 and 18 with the count value of the counter 16, and for supplying the hold circuit 15 with coincidence detection pulses, respectively. Since the remaining configuration is the same as that of the embodiment 2 as shown in FIG. 3, the description thereof is omitted here by designating the corresponding portions by the same reference numerals.

Next, the operation of the present embodiment 3 will be described.

Since the operations of the sync separation circuit 1, phase comparator 2, sync generator 3 and field decision circuit 5 are the same as those of the embodiment 2, only the operation of the output controller 4 will be described assuming that the two period setting registers 17 and 18 are set at "9" and "260", respectively.

First, the counter 16, after reset by the vertical synchronizing pulse, counts up by one each time the synchronizing signal component of the internal synchronizing signal Is is applied, and outputs its count value. When the count value reaches "9", the equality circuit 19 outputs the coincidence detection pulse, and the flip-flop 15 switches its output to the normal interval side in response to this. Thus, the selector 10 starts to output the output halt pulse train Ph with the shorter output halt period T2.

When the counter 16, continuing the up-counting, counts "260", the equality circuit 20 outputs the coincidence detection pulse, and the flip-flop 15 switches its output to the particular interval side in response to this. Thus, the selector 10 starts to output the output halt pulse train Ph with the longer output halt period T1.

In this way, the output controller 4 of the present embodiment 3 can switch the output halt period of each pulse of the output halt pulse train Ph in synchronism with the synchronizing cycles.

As described above, according to the present embodiment 3, the output controller 4 with the foregoing hardware configuration can prevent the internal synchronizing signal Is from being erroneously synchronized to the video input signal with its phase deviated by ½ synchronizing cycle. Furthermore, the internal synchronizing signal Is can be easily synchronized with the composite video signal Cv when the system is started or the composite video signal Cv is switched. Besides, the load of the operation means 12 can be reduced.

Moreover, varying the set values of the period setting registers 17 and 18 makes it possible to set the synchronizing cycles at which the output halt period is lengthened or shortened can be set at a desired value. This enables an optimum combination in accordance with the type of a system to which the present embodiment 3 is applied.

What is claimed is:

1. A sync signal generating unit for generating an internal synchronizing signal in synchronism with a video input signal, said sync signal generating unit comprising:

a phase comparator which receives the internal synchronizing signal and an input signal corresponding to the video input signal, and which outputs a period correcting signal in response to an input timing difference between a synchronizing signal component contained in the internal synchronizing signal and a synchronizing signal component contained in the input signal;

a sync generator for outputting said internal synchronizing signal with adjusting, in response to said period correcting signal, an output period of the synchronizing signal component of said internal synchronizing signal; and an output controller for generating an output halt pulse train for controlling said phase comparator such that the phase comparator suppresses output of said period correcting signal, wherein said output controller outputs the output halt pulse train consisting of pulses, each of which corresponds to one of synchronizing cycles of said input video signal and has a pulse width shorter than a period of the synchronizing cycles, and wherein said output controller, identifying the synchronizing cycles of the video input signal using the synchronizing signal components of one of the internal synchronizing signal and the input signal, makes the width of each pulse of said output halt pulse train in a particular interval longer than that in a normal interval outside the particular interval, said particular interval including at least synchronizing cycles containing synchronizing signal components occurring at every ½ synchronizing cycle interval, plus one synchronizing cycle previous to said synchronizing cycles.

2. The sync signal generating unit as claimed in claim 1, wherein said output control circuit comprises a counter for intermittently carrying out for each synchronizing cycle two types of counting corresponding to the width of the pulses of the output halt pulse train, and for outputting two count signals corresponding the pulse width of the output halt pulses, and a selector for selecting one of the two count signals, and for outputting it as the output halt pulse train.

3. The sync signal generating unit as claimed in claim 2, wherein said output controller further comprises a flag register which undergoes settings in response to individual synchronizing signal components of the internal synchronizing signal; operating means for resetting said flag register and outputting switching data in response to a number of times of said settings of the flag register; and a selecting register for supplying said selector with a select signal corresponding to the switching data.

4. The sync signal generating unit as claimed in claim 2, wherein said output controller further comprises a cycle counter for outputting a switching pulse in response to a number of input times of the synchronizing signal components of said internal synchronizing signal; and a holding circuit for supplying said selector with a select signal in response to the switching pulse.

5. The sync signal generating unit as claimed in claim 2, wherein said output controller further comprises a counter for outputting a count signal in response to a number of input times of the synchronizing signal components of said internal synchronizing signal; first and second period setting registers to which setting values corresponding to the particular interval and the normal interval are set, respectively; a first equality circuit for comparing an output of said first period setting register with the count value of said counter, and for outputting a coincidence signal when they agree with each other; a second equality circuit for comparing an output of said second period setting register with the count value of said counter, and for outputting a coincidence signal when they agree with each other; and a holding circuit for supplying said selector with a select signal in response to each of the coincidence signals.

6. A field decision unit comprising:

a sync signal generating unit for generating an internal synchronizing signal in synchronism with a video input signal; and a field decision circuit for making a field decision based on the input signal and the internal synchronizing signal after a synchronizing cycle has passed which contains synchronizing signal components occurring at every ½ synchronizing cycle;

wherein said sync signal generating unit comprises:

a phase comparator which receives the internal synchronizing signal and an input signal corresponding to the video input signal, and which outputs a period correcting signal in response to an input timing difference between a synchronizing signal component contained in the internal synchronizing signal and a synchronizing signal component contained in the input signal;

a sync generator for outputting said internal synchronizing signal with adjusting, in response to said period correcting signal, an output period of the synchronizing signal component of said internal synchronizing signal; and an output controller for generating an output halt pulse train for controlling said phase comparator such that the phase comparator suppresses output of said period correcting signal, wherein said output controller outputs the output halt pulse train consisting of pulses, each of which corresponds to one of synchronizing cycles of said input video signal and has a pulse width shorter than a period of the synchronizing cycles, and wherein said output controller, identifying the synchronizing cycles of the video input signal using the synchronizing signal components of one of the internal synchronizing signal and the input signal, makes the width of each pulse of said output halt pulse train in a particular interval longer than that in a normal interval outside the particular interval, said particular interval including synchronizing cycles containing synchronizing signal components occurring at every ½ synchronizing cycle interval, plus three synchronizing cycles previous to said synchronizing cycles.

* * * * *